2,841,575
AZO DYES FROM CONDENSATION PRODUCTS OF P-AMINOSALICYLIC ACID

Hans Z. Lecher, Plainfield, and Bennett G. Buell, Somerville, N. J., assignors to American Cyanamid Company, New York, N. Y., a corporation of Maine No Drawing. Original application June 16, 1953, Serial No. 362,146. Divided and this application February 14, 1956, Serial No. 565,319

7 Claims. (Cl. 260—144)

This invention relates to new coupling components of the formula

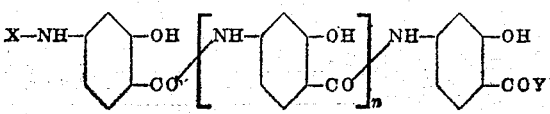

in which X is hydrogen or acyl and COY is a carboxylic acid or carboxarylide group and $n$ is an integer $>-1$.

Brown is a difficult shade to produce in azo dyes. When browns are formed, they are usually deficient tinctorially or in fastness properties. Thus, browns may be formed by coupling diazonium salts into arylides of p-aminosalicylic acid, but they are weak in color value and are not satisfactory in fastness values. There is a great need in the azo field for a good strong fast brown to fill out the range of colors available.

The new coupling components of the present invention can be used to produce browns of good properties. It is an advantage of the present invention that the new coupling components couple easily with the usual aromatic diazo compounds, producing shades which are stronger in color and better in fastness than those obtainable from p-aminosalicylic acid itself and its arylides. The number of diazo groups can be varied from as little as 1 group per coupling component molecule to as many as are represented by the number of rings in the coupling component. In other words, the number of azo groups can vary from 1 to $n+2$ depending on the particular coupling component. The shade of course varies with the proportions of the diazo compounds and hence with the number of azo groups per molecule.

The new coupling components can be considered as condensation polymers of p-aminosalicylic acid with or without additional groups attached to the terminal NH and to the terminal COOH group as represented by X and Y in the formula given above. Various methods may be used to produce the compounds. One good method is to heat the monomer, p-aminosalicylic acid, in an organic solvent with thionyl chloride. The thionyl chloride forms the acid chloride of p-aminosalicylic acid which condenses with more p-aminosalicylic acid in situ. We have found that the extent of condensation obtained by this process depends on the solvent. In solvents which are not good acid binding agents, such as, for example, dioxane, the product has an average molecular weight corresponding to a mixture of trimer or tetramer. However, when a tertiary base such as pyridine, picoline, dimethylaniline, quinoline and the like is used as a solvent, and thus maintains in the reaction mixture a good acid binding agent, the condensation goes further, producing an average molecular weight of product corresponding to the condensation of from 5 to 6 monomers.

When the condensation products are prepared by the above described methods, they have a terminal amino and a terminal carboxy group. In such a form they are useful as coupling components. If preferred, however, one or both of the terminal groups may be blocked by reaction with suitable reagents. For example, the carboxy groups can be reacted with aromatic amines such as aniline, p-chloroaniline, o-phenetidine, 2-methoxy-5-bromoaniline, 2-ethoxy-5-chloroaniline, p-anisidine, p-toluidine, o-toluidine, dianisidine, 2,5-dimethoxyaniline, alpha-naphthylamine, m-nitraniline, and the like to form arylides. The amino group at the other end of the polymer can also be tied up by acylation using, for example, acetic anhydride, benzoyl chloride or derivatives thereof.

In addition to the direct polymerization, polymers can be prepared by condensing an N-acyl-p-aminosalicylic acid chloride with an arylide of p-aminosalicylic acid. By careful deacylation of the product, the free aminosalicyloylaminosalicylarylide is formed, which can be made into a trimer by further reaction with an acyl-p-aminosalicylic acid chloride. The condensation product can thus be built up stepwise.

The coupling components prepared by either method and with or without the blocking of one or both of the terminal NH and carboxy groups, can be used to form azo dyes by the various methods in which azo dyes are normally produced. Thus for example, the dyes can be formed on the fiber by padding the coupling component and then over printing or immersing in a solution of the diazo compound desired, or the diazo compound may be converted into a diazoamino or other compound which does not couple in alkaline solution, incorporated into an alkaline printing paste containing the coupling component and printed, and the color developed on the fiber by conventional methods such as acid aging. If sufficient diazo compound is present, more than one diazo will couple on each molecule of the coupling component.

It is an advantage of the present invention that the coupling components may be used with any of the well-known and conventional diazo components. Thus, for example, there may be used diazo components such as dianisidine, benzidine, 4-nitro-2-methoxyaniline, 5-nitro-2-methoxyaniline, 2-nitro-4-methoxyaniline, 2,5-dichloroaniline, 4-benzamido - 2 - methoxy - 5 - methylaniline, 2-methyl-4-chloroaniline, 2-methyl-5-chloroaniline, 4-benzamido-2,5-dimethoxy (and diethoxy)-aniline, 2-methoxy-5-chloroaniline, 2-nitro-4-methylaniline, 2-methyl-4-nitroaniline, 3-amino-4-methoxybenzene sulfondiethylamide, 4-amino diphenylamine, 4-amino-4'-methoxy diphenylamine, alpha-aminoanthraquinone, and the like.

As has been pointed out above, the formation of dyed materials can be effected by any of the conventional methods of dyeing or printing with azo dyes. In some of the cases the diazo compound is applied in a form in which coupling takes place directly. In others, the diazo compound is stabilized against azoic coupling under alkaline conditions and is applied in the form of a paste or an alkaline dye bath and is then developed by setting free the diazo compound by means of acid vapors or other conventional methods. In each case the actual formation of the azo dyes involves a reaction of a diazo compound with the new coupling component and so when in the claims this reaction is referred to, it should be understood that it is intended to include any of the above cases regardless of whether the diazo compound is first added as such or is developed by acid aging or other methods.

The invention will be illustrated in greater detail in the following specific examples in which the parts are by weight unless otherwise specified.

Example 1

A mixture of 153 parts of 4-aminosalicylic acid and 1,000 parts of dioxane is stirred at 71–75° C. while 144 parts of thionyl chloride is added gradually. The mixture is then stirred at 65–70° C. for some time and then cooled to room temperature. The light yellow solid is filtered, washed and dried. This crude product is freed of monomer by slurrying in 1,000 parts of water and 300 parts of saturated sodium acetate solution, filtering, and washing with water and alcohol. It is a light yellow solid, insoluble in common organic solvents, water, or sodium bicarbonate solution. It dissolves in caustic soda solution. Nitrite titration shows the average molecular weight to be about 480. There are no additional groups attached to the terminal NH and COOH groups. The dyeings with the above compound show good fastness properties.

*Example 2*

A mixture of 15.3 parts of 4-aminosalicylic acid in 100 parts of pyridine is stirred at 55–60° C. while 16.3 parts of thionyl chloride is added gradually. The mixture is then stirred at 55–60° C. for some time, and finally cooled. It is then drowned in 500 parts of water, and the drowned mixture is neutralized with sodium bicarbonate. The pyridine is removed with steam, and the residual liquor is acidified with acetic acid. The gelatinous product is isolated by filtration and dried in vacuo over caustic potash. It has the same characteristics as the product of Example 1 except that its average molecular weight is about 700. The dyeings with the above compound show good fastness properties.

*Example 3*

Two parts of the product of Example 1 is dissolved in 60 parts of water and 0.54 part of sodium hydroxide. Two parts of o-chlorobenzoylchloride is added, and the mixture is stirred a short time at room temperature. Carbon dioxide gas is then passed through to neutralize the caustic and the light-colored product is isolated by filtration. It is purified by extraction with dilute hydrochloric acid and dilute sodium bicarbonate. It is insoluble in organic solvents and dissolves very slowly in caustic soda. The dyeings with the above compound show good fastness properties.

*Example 4*

A mixture of 6 parts of the product of Example 1, 6.35 parts of p-chloroaniline, 40 parts of toluene, and 1.57 parts of phosphorus trichloride is stirred at reflux until the reaction is substantially complete. The mixture cooled, and the product is isolated by filtration. It is purified after drying by alkaline extraction with sodium carbonate solution and then acid extraction with dilute rydrochloride acid. The dyeings with the above compound show good fastness properties.

*Example 5*

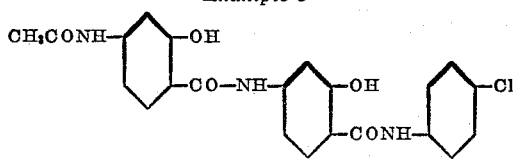

A mixture of 39 parts of 4-acetaminosalicylic acid, 50 parts of 4'-chloro-4-aminosalicylanilide and 440 parts of toluene is stirred at 90° C. while 15.4 parts of phosphorus trichloride is added gradually. The mixture is refluxed until the reaction is substantially complete, and then cooled. The product is isolated by filtration and after drying, is freed of by-products by repeated extraction with aqueous sodium bicarbonate. It is finally precipitated with acid from a caustic soda solution. The product is a light-colored solid which does not melt below 325° C. and is insoluble in most organic solvents except pyridine. It can be recrystallized from a pyridine-alcohol mixture to give a white solid with the correct analysis. Dyeings with the above compound show good fastness.

*Example 6*

The product of Example 1 was incorporated in a standard printing formulation, in a concentration of 1%, and printed on cotton cloth. The cloth was then treated with various diazotized aromatic amines to permit coupling on the fiber. The products had the following shades:

| Amine: | Color of dye |
|---|---|
| Dianisidine | Red brown. |
| 4-chloro-2-nitroaniline | Yellow brown. |
| 1-aminoanthraquinone | Brown. |
| 4-methoxy-2-nitroaniline | Olive brown. |
| m-Chloroaniline | Red brown. |
| 2,5-dichloroaniline | Olive brown. |
| 2-methoxy-4-nitroaniline | Red brown. |

The dyeings with the above compound show good fastness properties.

*Example 7*

Printing pastes of the following compositions were compounded and used to print cotton cloth. The printings, after acid aging, gave the indicated colors:

| | Structure | Components | Amount |
|---|---|---|---|
| A | $O_2N-\phi-N=N-N(CH_3)(C_2H_5)-\phi(NaOOC)(SO_3Na)$ | | 49.6 parts. |
| | | Product of Example 1 | 17.6 parts. |
| | | Sodium Aluminate | 2 parts. |
| | | Sodium sulfate | 3.2 parts. |
| | | Color | bright red brown. |
| B | $(NaOOC-CH_2-N-N=N-\phi(OCH_3))_2$ with $CH(CH_3)_2$ | | 54.4 parts. |
| | | Product of Example 1 | 31.2 parts. |
| | | Sodium aluminate | 4.0 parts. |
| | | Sodium sulfate | 96.8 parts. |
| | | Color | red brown. |
| C | $O_2N-\phi-N=N-N(CH_3)(C_2H_5)-\phi(NaOOC)(SO_3Na)$ | | 51.9 parts. |
| | | Product of Example 2 | 16.9 parts. |
| | | Sodium aluminate | 2.0 parts. |
| | | Sodium sulfate | 0.6 parts. |
| | | Color | brown. |
| D | $O_2N-\phi-N=N-N(CH_3)(C_3H_5)-\phi(NaOOC)(SO_3Na)$ | | 40.9 parts. |
| | | Product of Example 5 | 21.9 parts. |
| | | Sodium aluminate | 2.0 parts. |
| | | Sodium sulfate | 12.4 parts. |
| | | Color | light yellow brown. |
| E | $(NaOOC-CH_2-N=N-\phi(OCH_3))_2$ with $CH(CH_3)_2$ | | 13.6 parts. |
| | | Product of Example 3 | 11.2 parts. |
| | | Sodium aluminate | 1.0 part. |
| | | Sodium sulfate | 20.8 parts. |
| | | Color | light copper brown. |
| F | $(NaOOC-CH_2-N-N=N-\phi(OCH_3))_2$ with $CH(CH_3)_2$ | | 27.2 parts. |
| | | Product of Example 4 | 21.4 parts. |
| | | Sodium aluminate | 2 parts. |
| | | Sodium sulfate | 42.6 parts. |
| | | Color | dark red brown. |

The dyeings with the above compound show good fastness properties.

This application is a division of our copending application Serial No. 362,146, filed June 16, 1953.

We claim:
1. Azo dyes obtained by coupling a compound of the structure

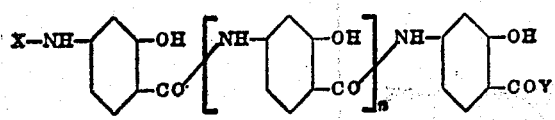

in which X is selected from the group consisting of H and carboxylic acyl, Y is chosen from the group consisting of OH and —NH—Ar in which Ar is an aryl radical and $n$ is an integer $>$—1 with a diazo compound.

2. Azo dyes according to claim 1 in which $n$ is an integer $>$—$1<7$ and the carboxylic acyl group does not contain more than 1 carbocyclic ring.

3. Azo dye mixtures having the structure

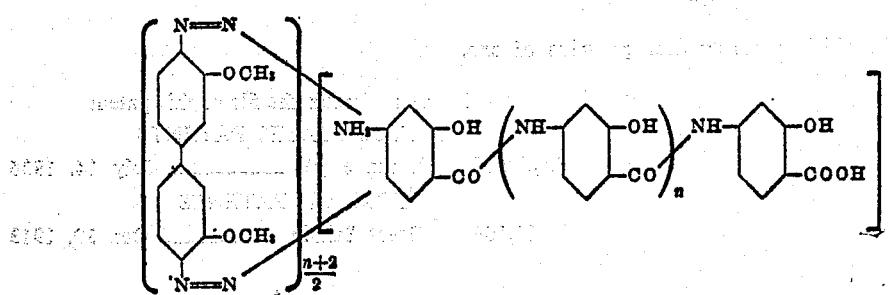

in which $n$ has an average value of one.

4. Azo dye mixtures of the formula

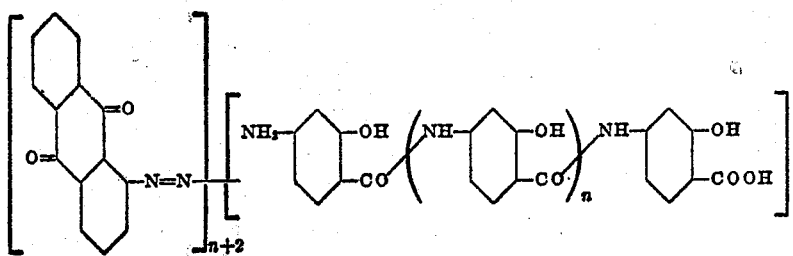

in which $n$ has an average value of one.

5. Azo dye mixtures of the formula

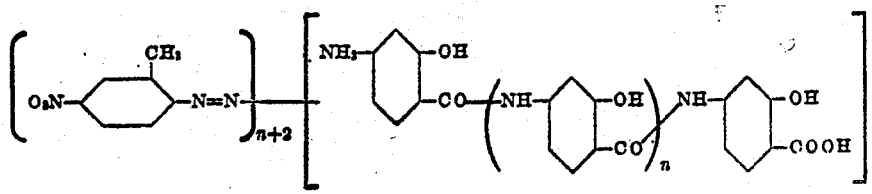

in which $n$ has an average value of three.

6. Azo dye mixtures of the formula

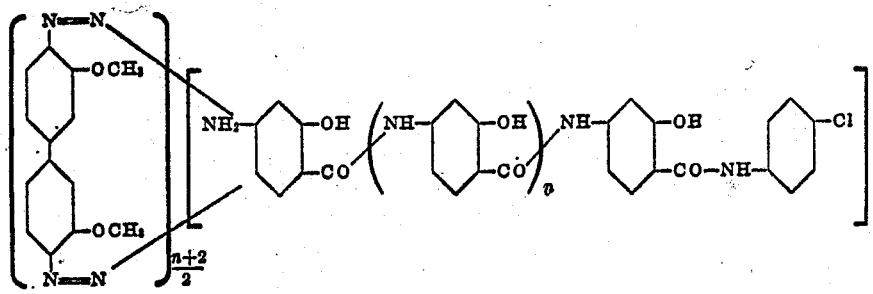

in which $n$ has an average value of one.

7. Azo dye mixtures of the formula
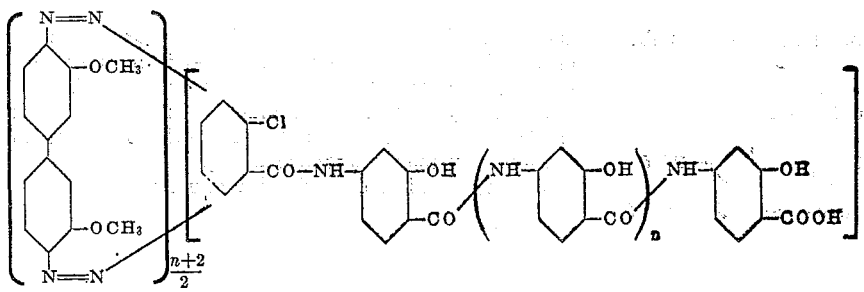
in which $n$ has an average value of one.
References Cited in the file of this patent
UNITED STATES PATENTS
2,047,515   Laska et al. _____ July 14, 1936
FOREIGN PATENTS
10,168   Great Britain _____ Oct. 30, 1913